United States Patent

Schold

[11] Patent Number: 5,604,001
[45] Date of Patent: Feb. 18, 1997

[54] DRYWALL FINISHING TAPE WITH ADHESIVE LAYER FOR EXPOSED DRYWALL CORNERS

[76] Inventor: Carl Schold, 9714 Anderson Village Dr., Austin, Tex. 78729-2702

[21] Appl. No.: 531,641

[22] Filed: Sep. 21, 1995

[51] Int. Cl.$^6$ ........................................ B32B 3/08
[52] U.S. Cl. .................. 428/41.8; 428/167; 428/220; 428/354; 428/40.1; 52/287.1; 52/417
[58] Field of Search .................... 428/40.1, 167, 428/354, 220, 41.8; 52/417, 287.1, 255

[56] References Cited

U.S. PATENT DOCUMENTS 4,719,732  1/1988  Bernard ........................ 52/287.1
5,368,907  11/1994  Conboy ........................... 428/43

Primary Examiner—Alexander Thomas
Attorney, Agent, or Firm—John P. Halvonik

[57] ABSTRACT

A dry wall paper finishing tape or strip having a base layer of drywall paper and an adhesive layer on the inner surface of such tape. Such adhesive surface may be overlaid with release paper that can be removed when the paper is ready for application to a drywall surface. A pair of raised plastic beads border the centerline of the paper strip on the inner surface and allow for a thinner section at the midline of the tape. Each bead is somewhat thicker near the middle and hence tapered near each edge. The base layer is also tapered so that the edges are of thinner cross section than the middle portion of the tape.

5 Claims, 1 Drawing Sheet

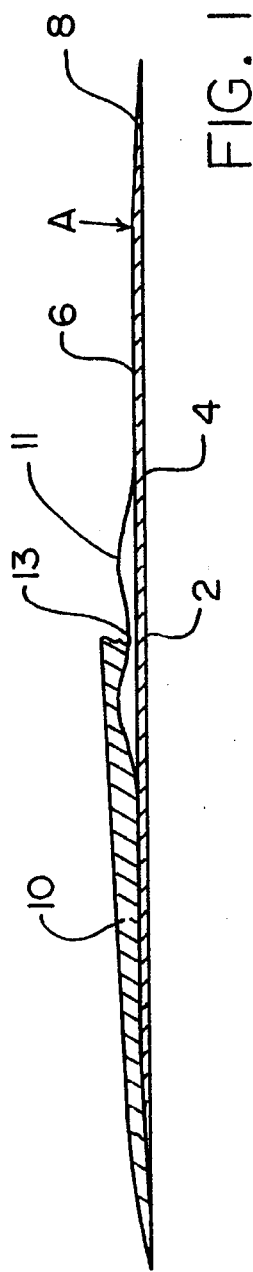
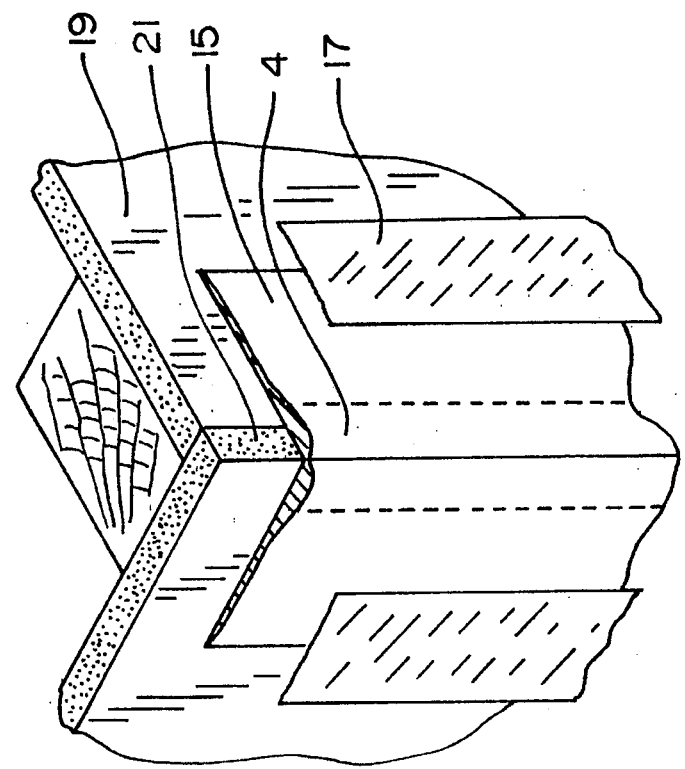
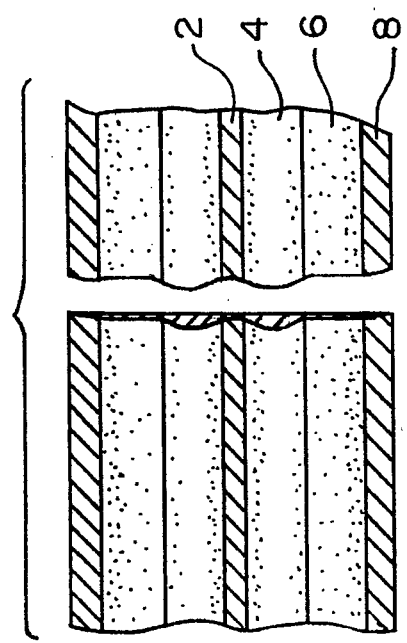
FIG. 1
FIG. 3
FIG. 2

DRYWALL FINISHING TAPE WITH ADHESIVE LAYER FOR EXPOSED DRYWALL CORNERS

FIELD OF THE INVENTION

The invention relates to the field of construction and, in particular, to a drywall tape or finishing tape that can be adhered to drywall surfaces typically at or near the corners of drywall boards in order to provide a continuous drywall paper over the entire surface of a wall including the corners.

BACKGROUND OF THE INVENTION

Modern residential and commercial construction includes the use of drywall material in the early stages of construction of the walls. Drywall paper material typically covers the face of the board but not the side edges; see face 19 and edge 21 in FIG. 3. Therefore, at the corner constructions of walls using drywall boards there is a gap where there is no drywall paper surface because at the corner of a wall the side of the drywall board is exposed. This presents a surface that does not have drywall paper. The use of drywall tape or other finishing materials is typically used to finish off such an area of the drywall in order to have a continuous drywall paper surface along the entire surface of wall, especially at the corners.

the applicant's invention dispenses with the need for additional steps of having to add mud or plaster to the drywall tape in order to smooth out the drywall tape layer in order to make the surface appear smooth.

PRIOR ART

While there are drywall tape or finishing materials that are used to finish off corners such as U.S. Pat. No. 5,313,755 to Koenig, Jr. and U.S. Pat. No. 5,368,907 to Conboy, most such inventions require the use of drywall mud in addition to the tape in order to finish off the corner because such tapes do not provide a smooth finish by themselves. Typically there would be a raised up portion of the tape at an exterior corner. Again in the case of interior corners, there may be a less than flush meeting of the tape and the wall. I.e. the tape forms a less than 90° angle at an interior corner. Finishing such prior art tape requires the use of one or several coats of drywall mud in order to smooth out the surface and then sanding these coats down. Such smoothing is needed to provide a smooth exterior finish once the wall is completed. However having to apply one or more coats of mud or plaster and a subsequent sanding step simply adds to the completion time because the mud needs to dry, etc. Having to apply drywall mud also makes for more work.

That invention of Conboy's, for instance, has a large bead which when applied to the corner does not allow for a square, 90° corner, as the rather thick bead sticks outward for some distance. This bead is subsequently covered with a dry wall mud in order to make it smooth however, the large protrusion remains. This makes it hard to fit base boards or trim into such a corner because the corner is not square. Similarly, in the Conboy invention the drywall accessory is not of uniform thickness once it has been applied to the corner and it will require one or more coats of drywall mud in order to smooth that area. This in addition to a sanding step.

None of the prior art is believed to teach the use of a wallboard paper that may be applied to corners of wallboard during the construction process without having to use drywall mud or mortar to complete the application process. The applicant's invention allows such drywall finishing material to be applied quickly and without extensive labor. The only additional step being to spackle the edges (as opposed to middle part that goes over the corner) of the tape. No mud or sanding is needed to finish. Moreover none of the prior art is believed to show the use of a wall board paper having edges that taper as one approaches the edges or having a thin interior bead.

SUMMARY OF THE INVENTION

A dry wall paper material strip for application to the exposed surfaces of wallboard during the construction process is shown and described. Such tape or finishing material has a base layer of paper of the same or similar composition to that to the finished, paper covered, surfaces of drywall boards. On one surface of the drywall tape, designated the inner surface, there is an adhesive layer that is designed to adhere to the exposed surface of the drywall. Such adhesive surface may be overlaid with release paper that can be removed when the paper is ready for application to a drywall surface.

There is a plastic bead also on the inner surface of the paper. This bead has a pair of raised portions, one on each side of the centerline of the paper strip. The bead is of smaller width than the tape with a 3" width being preferred. The plastic bead should be on the same side as the adhesive layer. The adhesive would preferably overlie both the paper and the plastic. Each raised surfaced of the bead should be to one side of the centerline of the strip so that at the actual midline of the tape the plastic layer will be very thin. The thinner portion of plastic at the midline of the tape encourages the tape to bend at both interior and exterior corners. The paper base layer is tapered so that each edge of the paper is of thinner cross section than the middle portion of the paper.

It is among the objectives of the invention to provide a drywall finishing material that can overlie those areas of the drywall boards that are not covered with drywall paper typically found on the exterior surfaces of such drywall boards.

Another objective is to provide a drywall finishing material or tape that can be easily applied to drywall corners without having to undergo the additional steps of adding drywall mud and sanding that is typical of state of the art drywall tapes.

Another objective is to provide a drywall finishing tape that is of uniformly smooth surface and of the same material as the surface of drywall board, and does not need to use additional materials in order to smooth out the surface of such tape.

Another objective is to provide a drywall finishing tape that provides a drywall type of finish along the rough corners of drywall construction and is ready for decoration as soon as it is applied to the wall board and will not rust, flake, chip or leave unsightly mortared edges.

Other objectives will become known to those skilled in the art once the invention is shown and described.

BRIEF DESCRIPTION OF FIGURES

FIG. 1 Cross section of drywall tape with a portion of adhesive layer removed for clarity;

FIG. 2 View of inner surface of tape;

FIG. 3 Application of tape to a corner.

DESCRIPTION OF THE PREFERRED EMBODIMENT

The overall construction of the drywall tape or finishing material is shown in FIGS. 1 and 2. The base member should be comprised of a drywall paper that is of a composition that is the same or similar to that of the outside paper layer of typical drywall boards. It is preferred that the width of such tape be about 8". The length may be of virtually any length as the tape can come in rolls. The base member of paper would thus be of the same width as the tape.

The outer edges 8 of the paper base layer should be buffed, or otherwise worked in the manufacturing process, in order that the edges be thinner than the middle portion of the base layer. One such machine that can perform such a buffing process is known as a Skiver machine and is manufactured by Payco Winders Manufacturing Inc. of Philadelphia, PA.

The paper will thus have a thickness of about 0.012" at the midline (2 in FIG. 1) and taper to almost nothing at the edges. Such a tapered down cross section allows for a finishing layer of, for example, spackling 17 to be applied to the edges of the tape in order to smooth the finish.

On the inner surface there is a plastic bead (13 and 11) having raised portions 11 on each side of the midline 2 of the tape. The bead should run the length of the tape. At the midline of the plastic bead 13 (which corresponds to the midline of the paper base) the plastic layer will be relatively thinner than the raised portions. The raised portions of the plastic bead would preferably be about 0.016" in height.

Also, on the inner surface of the base paper layer is a layer of adhesive 10. The adhesive should cover both plastic and paper and thus will cover those areas 2, 4, 6, and 8 of the tape. The inner surface will come in contact with the drywall board after the backing layer is removed and the adhesive surface applied to the dry wall. The outer surface 15 is opposite and will face the interior of the structure after the tape has been applied. It is preferred that the adhesive be of the hot melt variety.

This thin plastic area 13 along the center line 2 will enhance the hinging action of the base member when the tape is applied to a corner. The thinner area of the plastic will also help to align the tape along the edge of the corner. The plastic layer may be extruded onto the paper and plastic during the manufacturing process and it is believed that will eliminate the need for an extra step to bond the plastic to the paper.

It is preferred that the plastic bead should be about 2" in width; or about 1" on either side of the midline. The area 4 on either side of the midline has paper, plastic and adhesive and the area 2 at the midline also has paper, plastic and adhesive. Thus, there will be about a 3" wide area (6 and 8) on the edge of each tape that is not covered by the plastic bead, this area (6 and 8) is essentially base layer and adhesive. The edge 8 of this area of the base paper should be buffed starting at point A (about 1.25" from the edge). This buffed edge of the paper base will be thinner than the middle portion of the paper base and the paper will get gradually thinner approaching the edges of the paper.

When in use a backing member that overlies the adhesive is removed to expose the adhesive layer on the inner surface of the tape. The backing layer may comprise a silicone based release paper. Once exposed, the tape may now be placed over a corner that has an exposed drywall edge; 21 in FIG. 3. The centerline of the tape should be directly on the corner so that each raised portion of the plastic bead will be on one side of the corner. The sides of the tape should be finished by applying spackling to the outer surface of outer edges of the tape. The tape may be applied to inside corners or exterior corners as well as ceiling areas and any other areas that may be deemed appropriate by the user of such.

I claim:

1. A drywall finishing tape comprising: a base member of drywall paper having a pair of edges and a middle portion, an inner surface, an outer surface and a centerline, a bead of plastic of about 2" in width in connection with said inner surface, said bead overlying said centerline and said plastic bead having a pair of raised surfaces at each side of said centerline, a layer of adhesive on said inner surface and overlying said plastic bead, said edges of said paper of thinner section than said middle portion.

2. The article of claim 1 wherein said raised portions of said bead are about 0.016" in thickness.

3. The article of claim 2 wherein said base member is about 8" in width.

4. The article of claim 3 wherein said plastic bead is about 3" in width.

5. The article of claim 4 having a release paper in connection with said adhesive layer.

* * * * *